United States Patent Office 3,446,719
Patented May 27, 1969

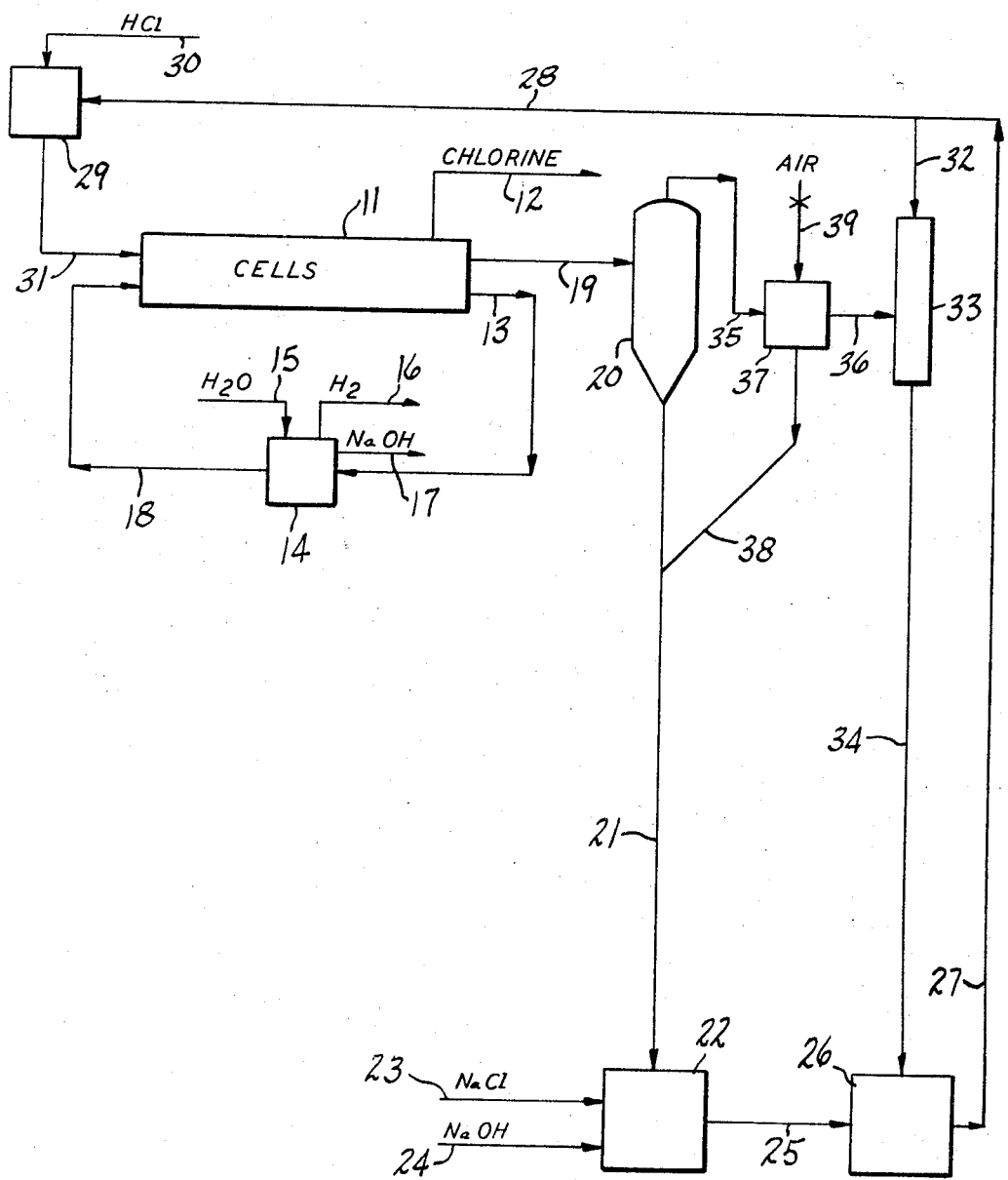

3,446,719
DECHLORINATION OF BRINE AND
RECOVERY OF CHLORINE
Bernard H. Nicolaisen, Stamford, Conn., assignor to Olin Mathieson Chemical Corporation, a corporation of Virginia
Filed Feb. 16, 1965, Ser. No. 433,077
Int. Cl. C01d 3/14, 3/04, 1/08
U.S. Cl. 204—99                                5 Claims

ABSTRACT OF THE DISCLOSURE

Alkali metal chloride brines effluent from electrolytic cells, especially mercury cathode cells, are dechlorinated by passing the acidic brine to a vacuum zone wherein the vacuum is produced by passing alkaline alkali metal chloride brine through a barometric leg and recycling the brine containing the recovered chlorine from said barometric leg to said electrolytic cell. The alkaline alkali metal chloride brine provides a medium in which the chlorine removed from the acidic brine is dissolved and recovered.

---

This invention relates to the purification of alkali metal chloride brines and more particularly to the dechlorination of weak brines effluent from electrolytic cells, especially mercury cathode cells, and the recovery of the chlorine removed from such brines.

In the electrolysis of alkali metal chloride brines in mercury cathode cells, a strong, aqueous solution of alkali metal chloride is introduced into the cells where a portion of the solute is decomposed. The alkali metal is dissolved in the mercury cathode to form an alkali metal amalgam and chlorine gas is liberated at the anodes. Weak brine is removed from the cells. It is usually dechlorinated, fortified with additional solute, alkalized, purified, acidified and returned to the cells. In mercury cell operation, the purity and concentration of the brine are especially important for efficient operation. As a result, the brine treating plant may be larger and require more operating personnel than the electrolysis portion of the plant. As much as 10,000,000 gallons or more of brine may be in process in many mercury cell plants. Details of the prior art operation of both parts of a mercury cell plant are well-known; see, for example, Ind. Eng. Chem. v. 45, No. 9, pp. 1824–1835 (1953). The effluent weak brine is saturated with dissolved chlorine and this amounts to both an economic loss and a disposal problem.

Effluent weak brine has usually been dechlorinated by aeration or vacuum or both, principally to avoid corrosion of equipment used in handling the brine in subsequent operations. Usually the dechlorinated weak brine is passed through a bed of salt crystals, suitably rock salt, to dissolvers, post dissolvers, treating tanks, surge tanks, settlers, filters and storage tanks. The chlorine removed from the brine has usually been considered too dilute and difficult to recover to justify its recovery as saleable, liquid chlorine. It has frequently been absorbed in lime or limestone and discarded. One such brine system is shown diagrammatically in Chem. Engineering, June 1950, pp. 178–181.

U.S. Patent 3,052,612 teaches that dilute chlorine in the form of "blow-off gas" can be absorbed in the recycle, alkaline brine and returned to the electrolysis whereby the chlorine from the "blow-off gas" is eventually recovered as liquid chlorine.

The chlorine dissolved in the weak brine is recovered according to the process of the present invention without producing a "blow-off gas" such as is obtained when the brine is dechlorinated by vacuum pumps or by aeration. The chlorine is further recovered in liquefiable, saleable form.

According to the process of the present invention, alkalized recycle brine at ambient temperature is pumped to a barometric condenser and used therein to produce the vacuum to which the weak brine, effluent from the electrolytic cells and saturated with chlorine, is subjected. The dissolved chlorine is removed as vapor from the hot, acid brine effluent from the cells. It dissolves readily in the cooler, alkalized brine in the barometric condenser which is then recycled to the electrolysis. The chlorine from the recycle brine is thus delivered to the cells and is eventually recovered as liquid chlorine.

The effluent brine from the cells usually has a pH below 3 and in some operations is as low as 1 but is preferably in the range from 2.3 to 2.6. If the brine should be above 3, acid is appropriately added to bring the pH below 3. The alkaline brine usually has a pH above 9.5, and is preferably about 10 to 10.5 or more. The effluent brine from the cells usually has a temperature of about 80° C. but this may vary from about 50 to 95° C. at atmospheric pressure.

The effluent brine from the cells is pumped to a dechlorinator, appropriately rubber-lined, and is discharged through a barometric leg. At the same time alkalized recycle brine at ambient temperature, usually below 40° C. is pumped to a barometric condenser and discharged through the leg. Cooling water is not ordinarily required in the condenser but is suitably used when higher vacuum is desired. The vacuum is suitably increased, when necessary by backing up the barometric condenser with a steam jet but this is usually unnecessary and the added cost is advantageously avoided. The vacuum is appropriately adjusted, when too high, by bleeding air into the system between the dechlorinator and the condenser and this is advantageously controlled automatically. However, air leakage into the system is generally to be avoided. Preferably the vacuum is controlled in the range of about 15 to 20 inches of mercury to insure thorough removal of dissolved chlorine from the weak brine without distilling large amounts of water from the hot, weak brine to the cool, alkaline brine.

All the steel parts of the system in contact with weak, acid brine containing dissolved chlorine are protected by rubber lining, by a coating of chlorine-resistant polyester resin or other appropriate coating. This prevents corrosion of the metal parts and metallic contamination of the brine. Parts in contact only with alkaline brine need no special protection.

Accompanying figure exemplifies the process of the present invention. Brine is electrolyzed in cells 11, producing chlorine gas, removed via line 12 for washing, drying and liquefaction (not shown). Amalgam, produced in cells 11, flows via line 13 to decomposer 14 to which water is introduced via line 15. Hydrogen gas and caustic leave the decomposer 14 via lines 16 and 17, respectively. Denuded mercury is returned to cells 11 via line 18.

Effluent weak brine passes from cells 11 via line 19 to dechlorinator 20 and falls via barometric leg 21 to brine treatment operations 22. There the brine is resaturated with salt added via line 23 and alkalized by the addition of caustic via line 24. Purified alkaline brine is transferred via line 25 to alkaline brine storage 26. Alkaline brine is pumped via lines 27 and 28 to head tank 29 where it is acidified to a controlled pH by the addition of hydrochloric acid via line 30. Acidified brine is metered to cells 11 via line 31.

Vacuum is produced in dechlorinator 20 by pumping alkaline brine via line 32 to condenser 33. The brine falls via barometric leg 34 to alkaline brine storage 26. The vacuum withdraws dissolved gases, principally chlorine and carbon dioxide from the weak brine in dechlorinator 20 via lines 35 and 36 where these gases dissolve in the alkaline brine in condenser 33. Between lines 35 and 36 is interpolated a separator 37 to remove spray from the gases and return it via line 38 to the dechlorinated brine in barometric leg 21. Separator 37 is also fitted with valved line 39 whereby air may be admitted as necessary to adjust and control the vacuum in dechlorinator 20.

EXAMPLE I

A chlorine-caustic plant was composed of a system of electrolytic mercury cells, a brine system and suitable auxiliary equipment. The brine system comprised suitable tanks, agitators, settlers, piping and pumps to fortify recycle brine by dissolving salt therein, to alkalize and purify the brine by the addition of suitable alkalies and other treating chemicals, to settle, filter and score the purified, fortified brine and to adjust the pH of brine for return to the electrolytic cells. The plant was operated essentially as shown in the accompanying figure. The weak brine having a pH of 2.2 as it flowed from the cells was pumped at an average rate of 657 gallons per minute to the dechlorinator. The alkaline brine at a pH of 10 was pumped to the barometric condenser at an average rate of 150 gallons per minute and this maintained a vacuum on the dechlorinator of 16.8 inches of mercury. The titre of the alkaline brine before and after the condenser showed that the chlorine recovered amounted to 1320 pounds per 24-hour day.

EXAMPLE II

In essentially the same system as described in Example I, the weak brine had a pH of 2.3 and was pumped at an average rate of 783 gallons per minute to the dechlorinator. The alkaline brine having a pH of 10 was pumped to the barometric condenser at an average rate of 150 gallons per minute, maintaining a vacuum on the dechlorinator of 16.5 inches of mercury. The titre of the alkaline brine before and after the condenser showed chlorine recovery of 905 pounds per 24-hour day.

The process of this invention is advantageously applied in the electrolysis of alkali metal chloride brines, particularly those of lithium chloride, sodium chloride and potassium chloride, but also rubidium chloride and cesium chloride.

What is claimed is:

1. The process of dechlorinating an acidic alkali metal chloride brine effluent from a mercury cathode electrolytic cell, said acidic brine saturated with chlorine at a temperature of 50 to 95° C., which comprises passing said acidic brine to a vacuum zone wherein the vacuum is produced by passing alkaline alkali metal chloride brine at a temperature below 40° C. through a barometric leg, simultaneously absorbing the gases thus removed from the acidic brine in said alkaline brine and recycling the brine discharged from said barometric leg to said electrolytic cell.

2. The process of claim 1 in which said acidic brine is removed from said vacuum zone through a second barometric leg, alkalized, resaturated and recycled to said first barometric leg to produce said vacuum.

3. The process of claim 1 in which said acidic brine has a pH of from 1 to 3.

4. The process of claim 1 in which said alkaline brine has a pH of from 9.5 to 10.5.

5. The process of claim 1 in which said vacuum is between 15 and 20 inches of mercury.

References Cited

UNITED STATES PATENTS 2,949,412  8/1960  Neipert et al. _____ 204—99
3,052,612  9/1962  Henegar et al. _____ 204—99

JOHN H. MACK, *Primary Examiner.*

H. M. FLOURNOY, *Assistant Examiner.*